United States Patent
Okitsu

(10) Patent No.: US 6,421,644 B1
(45) Date of Patent: Jul. 16, 2002

(54) INFORMATION APPARATUS FOR DISPATCHING OUTPUT PHRASE TO REMOTE TERMINAL IN RESPONSE TO INPUT SOUND

(75) Inventor: Hiromi Okitsu, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/361,094

(22) Filed: Jul. 26, 1999

(30) Foreign Application Priority Data

Mar. 8, 1998 (JP) .......................................... 10-219309

(51) Int. Cl.$^7$ .......................... G10L 15/10; G10L 21/00
(52) U.S. Cl. ..................... 704/270.1; 704/236; 704/275
(58) Field of Search ................. 704/270–275, 704/236

(56) References Cited

U.S. PATENT DOCUMENTS

| | | | | |
|---|---|---|---|---|
| 5,086,385 A | * | 2/1992 | Launey et al. | 704/270 |
| 5,774,841 A | * | 6/1998 | Salazar et al. | 704/251 |
| 6,052,666 A | * | 4/2000 | Diehl et al. | 704/275 |
| 6,073,101 A | * | 6/2000 | Maes | 704/275 |
| 6,173,259 B1 | * | 1/2001 | Bijl et al. | 704/270 |

FOREIGN PATENT DOCUMENTS

| | | | | |
|---|---|---|---|---|
| JP | 07-093669 | * | 4/1995 | G08B/5/22 |
| JP | 08-044473 | * | 2/1996 | G06F/3/023 |

* cited by examiner

Primary Examiner—Richemond Dorvil
Assistant Examiner—Daniel A. Nolan
(74) Attorney, Agent, or Firm—Pillsbury Winthrop LLP

(57) ABSTRACT

An information apparatus is constructed for notifying output information to a remote terminal in response to an input signal of a sound. In the information apparatus, a first memory block memorizes characteristic data representing characteristics of various sounds. A second memory block memorizes various items of output information in correspondence to the characteristic data of the various sounds such that each item of the output information is associated to each sound. An input device collects a sound to provide an input signal of the collected sound. An analyzer device extracts characteristic data from the input signal of the collected sound. A controller device operates according to the extracted characteristic data for addressing the first memory block and the second memory block to identity the item of the output information corresponding to the collected sound. A transmitter device transmits the identified item of the output information to the remote terminal. A new sound and a corresponding item of output information can be registered for updating the first memory block and the second memory block such that the analyzer device extracts new characteristic data from the new sound. The controller device registers the extracted new characteristic data into the first memory block and registers the corresponding item of the output information into the second memory block.

5 Claims, 3 Drawing Sheets

INFORMATION APPARATUS FOR DISPATCHING OUTPUT PHRASE TO REMOTE TERMINAL IN RESPONSE TO INPUT SOUND

BACKGROUND OF THE INVENTION

1. Field of the Invention

The present invention generally relates to an information announcing apparatus, an information announcing terminal device, and a method of controlling the information announcing apparatus. More particularly, the present invention relates to an information announcing apparatus, an information announcing terminal device, and a method of controlling the information announcing apparatus, that can detect and recognize a sound signal and that can notify a user of the information based on the recognition.

2. Description of Related Art

Voice recognition equipment is known in which a voice signal is detected, analyzed, and matched with one of recorded voice patterns. Then, the matching pattern is retrieved to identify the voice signal. Thus, the known voice recognition equipment detects from among recorded voice patterns a corresponding voice, and displays the kind and contents of the voice signal.

The following describes a general configuration of the known voice recognition equipment with reference to FIG. 3. As shown, a voice input block 110 detects a voice signal and converts the same into an electrical signal, which is then supplied to a voice analyzing block 120. The voice analyzing block 120 analyzes the frequency of the electrical signal, and supplies the analyzed results to a characteristic data extracting block 130. The characteristic data extracting block 130 extracts characteristic data of the frequency-analyzed voice signal, and supplies the extracted characteristic data to a characteristic data matching block 140. The characteristic data matching block 140 compares the extracted characteristic data with each of plural voice patterns stored in a characteristic data memory block 150 to retrieve a matching voice pattern.

Consequently, in response to the matching voice pattern stored in the characteristic data memory block 150, an information output block 170 reads output information associated to the corresponding voice characteristic pattern from an information memory block 160 which stores the output information for use by the user to evaluate and respond to the voice signal. Then, the information output block 170 produces the output information on a screen display or in the form of audio announcement.

However, in the conventional voice recognition equipment, the characteristic data memory block 150 only stores pre-selected characteristic patterns in advance. Therefore, new voice patterns cannot be stored after factory shipment. This disables the conventional voice recognition equipment to notify the user of the detection of a new voice signal that is not stored in the characteristic data memory block 150.

An aid device for notifying auditory handicapped persons of the detection of an input voice signal by media other than audio is disclosed in Japanese Published Unexamined Patent Application No. Hei 7-93669. With the disclosed device, if an alarm siren of an ambulance generated from a loudspeaker of a television set is incidentally picked up, the false alarm siren is erroneously recognized as a real alarm sound, thereby notifying the auditory handicapped person of the false information or message.

The conventional voice recognition equipment is constructed so that the voice input block and the information output block cannot be arranged at widely spaced locations. This construction limits the voice detecting range. In addition, the conventional equipment cannot allocate a source point of a voice signal. Consequently, the conventional equipment cannot provide information sufficient for the aid of auditory handicapped persons.

SUMMARY OF THE INVENTION

It is therefore an object of the present invention to provide an information announcing apparatus, an information announcing remote terminal, and a method of controlling the information announcing apparatus, to allow the user to register any desired sounds and prevent a false announcement caused by an artificial sound from a device such as a television set.

In a first aspect of the invention, an information apparatus is constructed for notifying output information to a remote terminal in response to an input signal of a sound. The information apparatus is comprised of a first memory block that stores characteristic data representing characteristics of various sounds, a second memory block that stores various items of output information corresponding to the characteristic data of the various sounds such that each item of the output information is associated with each sound, an input device that collects a sound to provide an input signal of the collected sound, an analyzer device that extracts characteristic data from the input signal of the collected sound, a controller device that operates according to the extracted characteristic data for addressing the first memory block and the second memory block to identify the item of the output information corresponding to the collected sound, and a transmitter device that transmits the identified item of the output information to the remote terminal, wherein a new sound and a corresponding item of output information can be registered to update the first memory block and the second memory block such that the analyzer device extracts new characteristic data from the new sound, and the controller device registers the extracted new characteristic data into the first memory block and registers the corresponding item of the output information into the second memory block.

In a second aspect of the invention, an information apparatus is constructed for notifying output information to a remote terminal in response to an input signal of a sound. The information apparatus is comprised of a first memory block that stores characteristic data representing characteristics of various sounds, a second memory block that stores various items of output information corresponding to the characteristic data of the various sounds such that each item of the output information is associated with each sound, a plurality of input devices that are spatially distributed to collect a sound from a source location, and that respectively provide input signals of the same sound, a detector device that processes the input signals provided from the spatially distributed input devices to detect the source location of the sound, an analyzer device that extracts characteristic data from at least one of the input signals of the collected sound, a controller device that operates according to the extracted characteristic data for addressing the first memory block and the second memory block to identity the item of the output information corresponding to the collected sound, and a transmitter device that transmits the identified item of the output information to the remote terminal together with the detected source location of the sound. Preferably, the information apparatus further comprises a canceler device that checks whether the output information associated with the sound is true or false according to the source location of the sound, and that cancels transmission of the output information if the output information is false.

In a specific form, the analyzer device analyzes a frequency spectrum of the sound to extract therefrom a characteristic pattern, which is stored as the characteristic data in the first memory block, and the controller device uses the characteristic pattern as an index to identity the item of the output information corresponding to the sound.

The inventive remote terminal for use in combination with the inventive information apparatus of the first aspect is comprised of a receiver device that receives the output information transmitted from the information apparatus, a stimulator device that is activated when the output information is received by the receiver device for physically stimulating a user of the remote terminal to draw attention of the user to the output information, a display device that displays the received output information such that the stimulated user can readily read the output information, a commander device that is operated by the user when a new sound is to be registered for inputting a command effective to activate the analyzer device of the information apparatus to extract the characteristic data from the new sound and to enable the controller device of the information apparatus to register the characteristic data together with the corresponding item of the output information, and a transmitter device that transmits the inputted command to the information apparatus.

The inventive remote terminal for use in combination with the inventive information apparatus of the second aspect is comprised of a receiver device that receives the output information transmitted from the information apparatus, a stimulator device that is activated when the output information is received by the receiver device for physically stimulating a user of the remote terminal to draw attention of the user to the output information, and a display device that displays the received output information such that the stimulated user can readily read the output information.

Further, an inventive informing method is designed for notifying output information to a remote terminal in response to an input signal of a sound. The informing method is comprised of the steps of storing characteristic data representing characteristics of various sounds in a first memory, storing various items of output information corresponding to the characteristic data of the various sounds in a second memory such that each item of the output information is associated with each sound, collecting a sound to provide an input signal of the collected sound, extracting characteristic data from the input signal of the collected sound, addressing the first memory and the second memory based on the extracted characteristic data to identity the item of the output information corresponding to the collected sound, transmitting the identified item of the output information to the remote terminal, and registering a new sound and a corresponding item of output information to update the first memory and the second memory such that new characteristic data is extracted from the new sound and the corresponding item of the output information is determined in association with the new sound, and then the extracted new characteristic data is stored in the first memory while the corresponding item of the output information is stored in the second memory.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings.

1. First Preferred Embodiment 1.1 System Configuration

Figure 1:
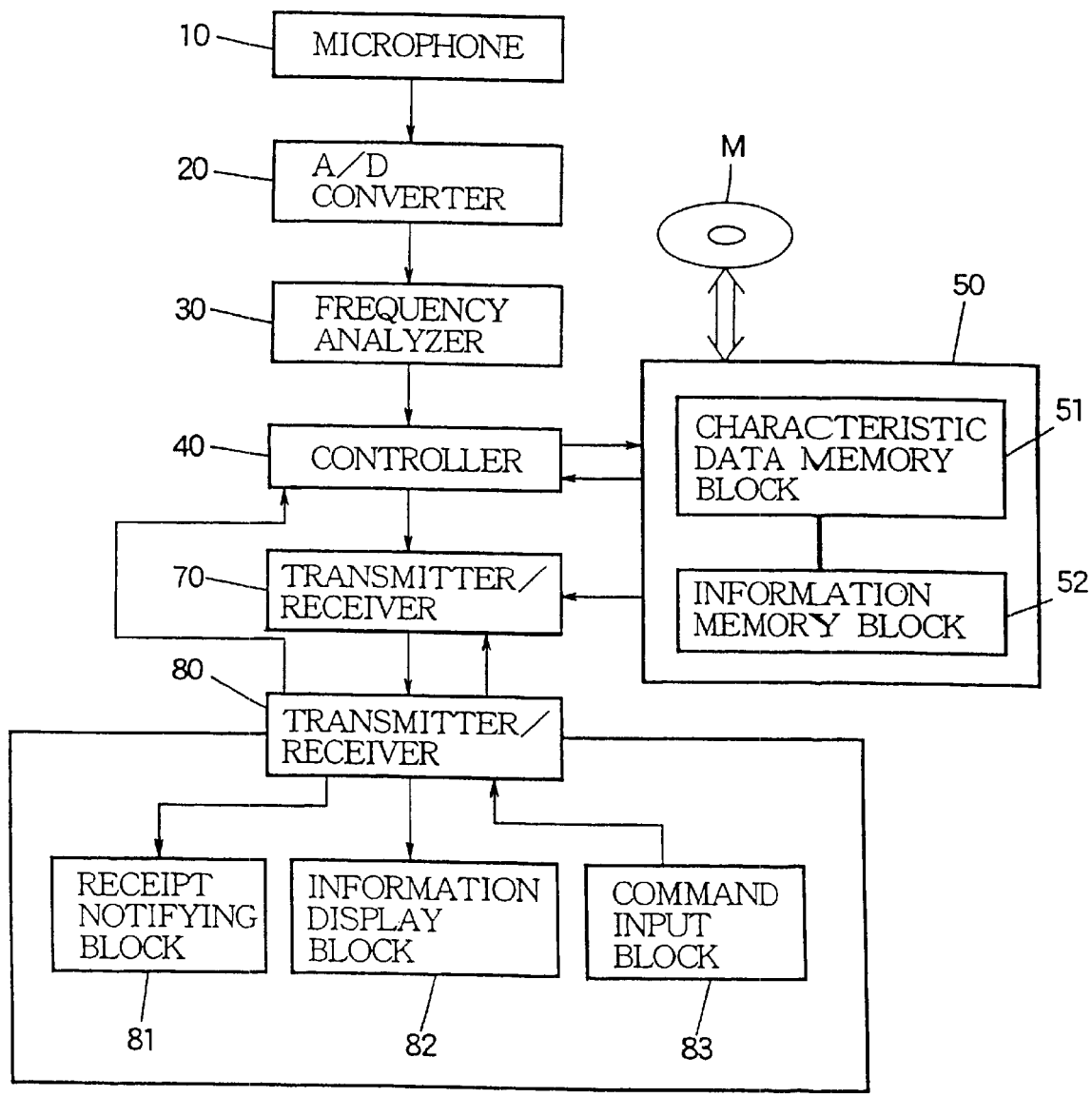
FIG. 1 is a block diagram illustrating a first preferred embodiment of the invention.

Now, referring to FIG. 1, reference numeral 10 denotes a microphone that is an input device for converting a collected sound into an analog electrical input signal. Reference numeral 20 denotes an A/D (Analog to Digital) converter for sampling the analog input signal and converting the sampled signal into a digital signal. Reference numeral 30 denotes a frequency analyzer for performing frequency spectrum analysis on the digital sound signal through FFT (Fast Fourier Transform) for example. Reference numeral 40 denotes a controller including a central processing unit (CPU) for controlling the operation of the entire information announcing apparatus. The operation includes steps of executing sound pattern extraction, pattern matching, and voice recognition. Reference numeral 50 denotes a memory device for storing the patterns of various sound signals extracted by the controller 40 and items of announcement information associated with these patterns. Reference numeral 70 denotes an information transmitter/receiver for converting the announcement information based on the sound analysis into a radio signal, transmits the same to another information transmitter/receiver 80. In return, the information transmitter/receiver 70 receives an operation command and other commands from the information transmitter/receiver 80 of a remote terminal. The information transmitter 80 converts the radio signal into the announcement signal again to notify the user of the information, and transmits an operation command to the controller 40 of the information announcement apparatus.

The memory device 50 is composed of a characteristic data memory block 51 for storing characteristic data of various input sounds in the form of sound patterns, and an information memory block 52 for storing the announcement information associated with the stored sound patterns.

The inventive information apparatus of FIG. 1 is constructed for notifying output information to the remote terminal in response to an input signal of a sound. In the information apparatus, the first memory block 51 stores characteristic data representing characteristics of various sounds. The second memory block 52 stores various items of output information corresponding to the characteristic data of the various sounds such that each item of the output information or phrase is associated with each sound. The input device composed of the microphone 10 collects a sound to provide an input signal of the collected sound. An analyzer device including the frequency analyzer 30 extracts characteristic data from the input signal of the collected sound. The controller device 40 operates according to the extracted characteristic data for addressing the first memory block 51 and the second memory block 52 to identity the item of the output information corresponding to the collected sound. A transmitter device contained in the transmitter/receiver 70 transmits the identified item of the output information to a receiver device contained in the transmitter/receiver 80 of the remote terminal. The inventive information apparatus has a registration mode, in which a new sound and a corresponding item of output information can be registered for updating the first memory block 51 and the second memory block 52 such that the analyzer device extracts new characteristic data from the new sound, and the controller device 40 registers the extracted new characteristic data into the first memory block 51 and registers the corresponding item of the output information into the second memory block 52.

The remote terminal includes the transmitter/receiver 80, an receipt notifying block 81 for telling the dispatch of the information from the information transmitter/receiver 70, an information display block 82, and a command input block 83 for transmitting an operation command to the controller 40 by means of a radio signal, thereby constituting a radio communication system capable of announcing the information in text and image (including motion pictures).

In the above-mentioned configuration, the information transmitter/receiver 70 of the information apparatus and the information transmitter/receiver 80 of the remote terminal may be replaced by a transmitter/receiver equipment having the capabilities equivalent to those-of commercially available PHS (Personal Handy-phone System), mobile telephone, and transceiver having a display capability for displaying announcement information and a termination indicating capability by means of physical stimulation such as vibration and light. When utilizing only the receiving capability of the information transmitter/receiver 80, the same may be replaced by a radio signal receiving device such as a pager.

1.2 General Configurations and Operations of Frequency Analyzer and Controller

The following describes the details of the frequency analyzer 30 and the controller 40 shown in FIG. 1. The frequency analyzer 30 performs FFT, for example, on an input sound signal supplied from the A/D converter 20, and develops the transformed sound signal to the time-series spectrum of frequency and amplitude variations, thereby providing a sound spectrum. The sound spectrum is supplied to the controller 40 in which a sound pattern characterizing the sound is extracted from the sound spectrum. The extracted sound pattern indicates the characteristics unique to the timbre and tone of the sound. If the information announcing apparatus according to the invention is set to the registration mode, the extracted sound pattern is stored in the characteristic data memory block 51 of the memory device 50 under the control of the controller 40. Namely, in the inventive information apparatus, the analyzer device including the frequency analyzer 30 and controller 40 analyzes a frequency spectrum of the sound to extract therefrom a characteristic pattern, which is stored as the characteristic data in the first memory block 51, and the controller 40 uses the characteristic pattern as an index to identity the item of the output information corresponding to the sound.

If the information announcing apparatus according to the invention is set to a normal recognition mode, the controller 40 sequentially compares the extracted sound pattern with the plural sound patterns stored in the characteristic data memory block 51, thereby identifying the best matching one (for example, a sound pattern having the closest similarity) as the sound pattern of the input sound. In doing so, a so-called pattern matching technique is used.

Next, the announcement information corresponding to the matching sound pattern is read from the information memory block 52. This information is converted by the information transmitter/receiver 70 into a radio signal, and is dispatched to the information transmitter/receiver 80 of the remote terminal.

1.3 Operation of the Information Announcing System

The following describes the operation of the information announcing system. The information announcing system practiced as the first preferred embodiment of the invention has the two operating modes: the registration mode in which sound patterns are stored in the characteristic data memory block 51 and the announcement information corresponding to these sound patterns is stored in the information memory block 52; and the recognition mode in which a sound pattern extracted from the input sound is matched against the sound patterns stored in the characteristic data memory block 51 for identifying one having the closest similarity. Before describing the operation of the information announcing system, these operating modes will be described below.

1.3.1 Registration Mode

When registering the information or phrase associated to an input sound signal to be recognized by the information announcing apparatus, the registration mode is selected in the operating mode setting. When the registration mode is selected and a sound signal to be recognized is inputted through the microphone 10, the sound pattern of the inputted sound signal is extracted by the frequency analyzer 30 and the controller 40. The extracted sound pattern is stored in the first memory block 51 via the controller 40. It should be noted that the new sound signal to be stored may include not only a human voice but also a telephone ringing tone, an alarm sound, a bark of dog, and so on. In addition, the announcement information or phrase for telling the meaning and contents of the sound signal is stored in the information memory block 52 of the memory device 50 via an input tool such as keyboard (not shown) or via the information transmitter/receiver 80. This announcement information is determined for telling the user of the remote terminal about the meaning and contents of the detected sound signal. This information includes data for displaying a text and a still image (or a motion picture) and a signal for telling a kind of the input sound by means of light, color, or vibration. The announcement information in the information memory block 52 is stored in one-to-one correspondence to each sound pattern stored in the characteristic data memory block 51.

As described, the inventive informing method is designed for notifying output information to a remote terminal in response to an input signal of a sound. The informing method is comprised of the steps of storing characteristic data representing characteristics of various sounds in the first memory block 51, storing various items of output information corresponding to the characteristic data of the various sounds in the second memory block 52 such that each item of the output information is associated with each sound, collecting a sound to provide an input signal of the collected sound, extracting characteristic data from the input signal of the collected sound, addressing the first memory block 51 and the second memory block 52 based on the extracted characteristic data to identity the item of the output information corresponding to the collected sound, transmitting the identified item of the output information to the remote terminal, and registering a new sound and a corresponding item of output information to update the first memory block 51 and the second memory block 52 such that new characteristic data is extracted from the new sound and the corresponding item of the output information is determined in association with the new sound, and then the extracted new characteristic data is stored in the first memory block 51 while the corresponding item of the output information is stored in the second memory block 52.

1.3.2 Recognition Mode

In the recognition mode, the kind and contents of an inputted sound signal is recognized. When the recognition mode is selected, a sound signal inputted through the microphone 10 is converted by the A/D converter 20 into a digital signal. The frequency analyzer 30 develops the digital sound signal into a frequency spectrum by means of FFT for example, and analyzes the frequency spectrum to extract a sound pattern. The controller 40 compares the extracted sound pattern with the sound patterns stored in the characteristic data memory block 51 to identify one sound pattern that has the closest similarity. Then, the controller 40 reads the announcement information associated with the recognized sound pattern from the information memory block 52, and sends this information to the information transmitter/receiver 70. The announcement information is converted by the information transmitter/receiver 70 into a radio signal, which is sent to the information transmitter/receiver 80 of the separate remote terminal.

1.3.2.1 Treatment of Announcement Information in Remote Terminal

The announcement information received from the information transmitter/receiver 70 is displayed on the information display block 82 of the remote terminal. This announcement information is the data for use in displaying text, graphics, and/or images, and is provisionally stored in the information memory block 52 in corresponding relation with the items of the sounds (or the sound patterns) stored in the characteristic data memory block 51. When the announcement information is received by radio from the information transmitter/receiver 70, the receipt notifying block 81 starts operating, for telling, by means of light and/or vibration, the terminal user of the arrival of the announcement information from the information transmitter/receiver 70. Then, when the user depresses a receive button of the information transmitter/receiver 80, the announcement information is displayed on the information display block 82. As described, the information memory block 52 stores the plural items of the announcement information to be displayed on the information display block 82 in corresponding relation with the sound patterns. The announcement information stored in the information memory block 52 is used to display the contents of the recognized sound in text and/or graphics. The announcement information tells the user, at a glance, of what kind of sound has occurred.

1.4 Selection and Setting of Operating Modes

An operating mode can be selected and set also by sending, by radio, an operating mode selection and setting command from the command input block 83 of the remote terminal to the information transmitter/receiver 70. When selecting and setting an operating mode from the command input block 83, the user selects and inputs by pressing one button corresponding to the registration mode or another button corresponding to the recognition mode on the operating mode selection and setting screen of the information display block 82.

1.5 Effects of First Preferred Embodiment

According to the first preferred embodiment of the invention, the information announcing system is provided with the registration mode for inputting and storing desired sound signals and their corresponding announcement information, thereby allowing the user to make the information announcing apparatus recognize a desired sound signal.

In addition, a command for the operating mode selection and setting is inputted from the command input block 83 of the remote terminal. The inputted command is sent by a radio wave to the information transmitter/receiver 70 to control the controller 40 of the information announcing apparatus. This constitution allows the user to remotely select and set the operation mode of the information announcing apparatus from the information transmitter/receiver 80 of the remote terminal. Within a range in which radio communication is enabled between the information transmitter/receiver 70 and the information transmitter/receiver 80, the information transmitter/receiver 80 becomes available as a portable device. Consequently, the novel constitution can transmit aid information to the user such as an auditory handicapped person, who is remote from the sound input device of the information announcing apparatus, and allows the user to command the operation of the information announcing apparatus.

The inventive remote terminal is designed for use in combination with the inventive information apparatus. In the remote terminal, the receiver device contained in the transmitter/receiver 80 receives the output information transmitted from the information apparatus. A stimulator device composed of the receipt notifying block 81 is activated when the output information is received by the receiver device for physically stimulating a user of the remote terminal to draw attention of the user to the output information. The display device 82 displays the received output information such that the stimulated user can readily read the output information. The command input device 83 is operated by the user when a new sound is to be registered for inputting a command effective to activate the analyzer device of the information apparatus to extract the characteristic data from the new sound and to enable the controller device of the information apparatus to register the characteristic data together with the corresponding item of the output information. A transmitter device contained in the transmitter/receiver 80 transmits the inputted command to the information apparatus.

2. Second Preferred Embodiment

2.1 System Configuration

Figure 2:
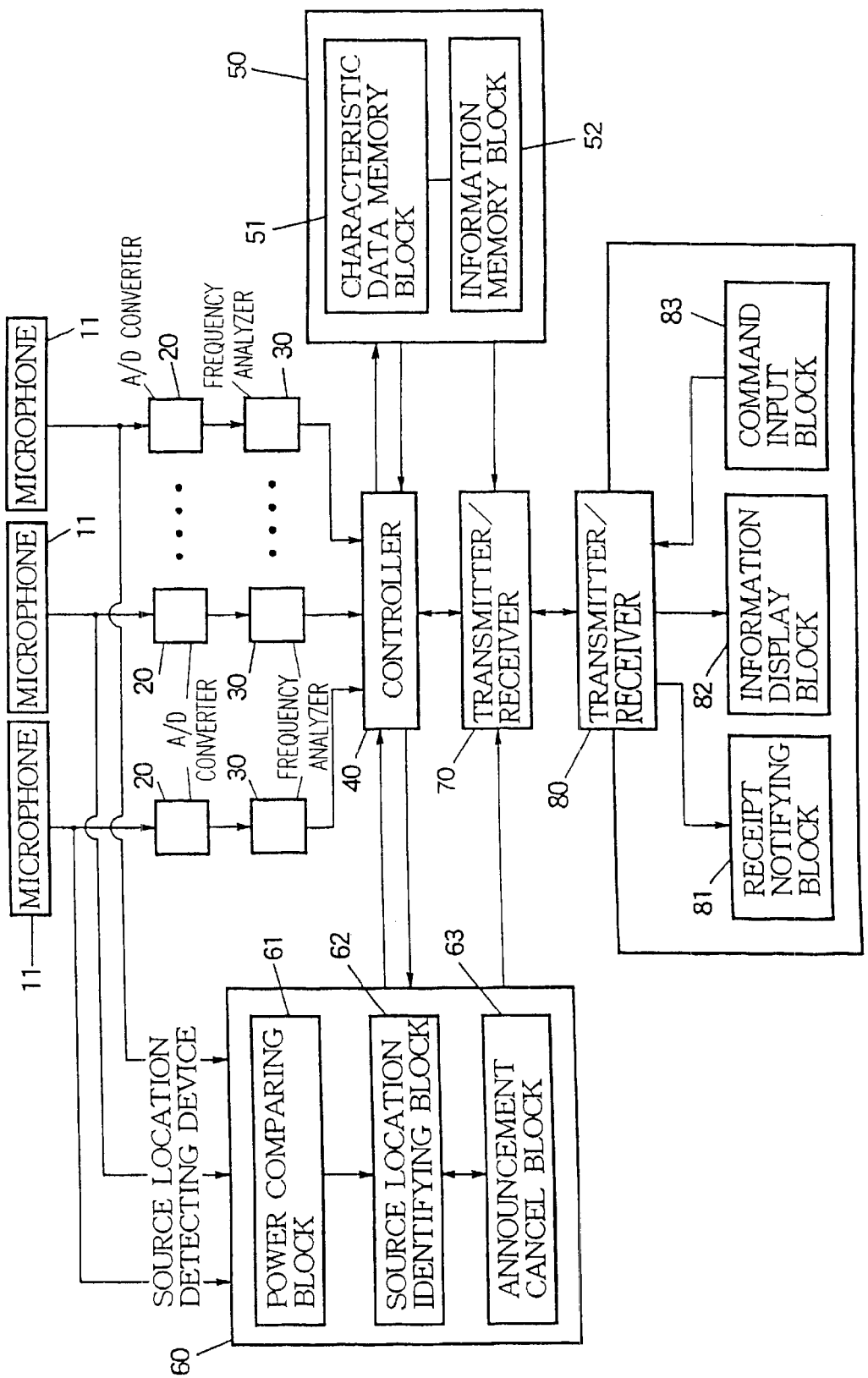
FIG. 2 is a block diagram illustrating a second preferred embodiment of the invention.
Figure 3:
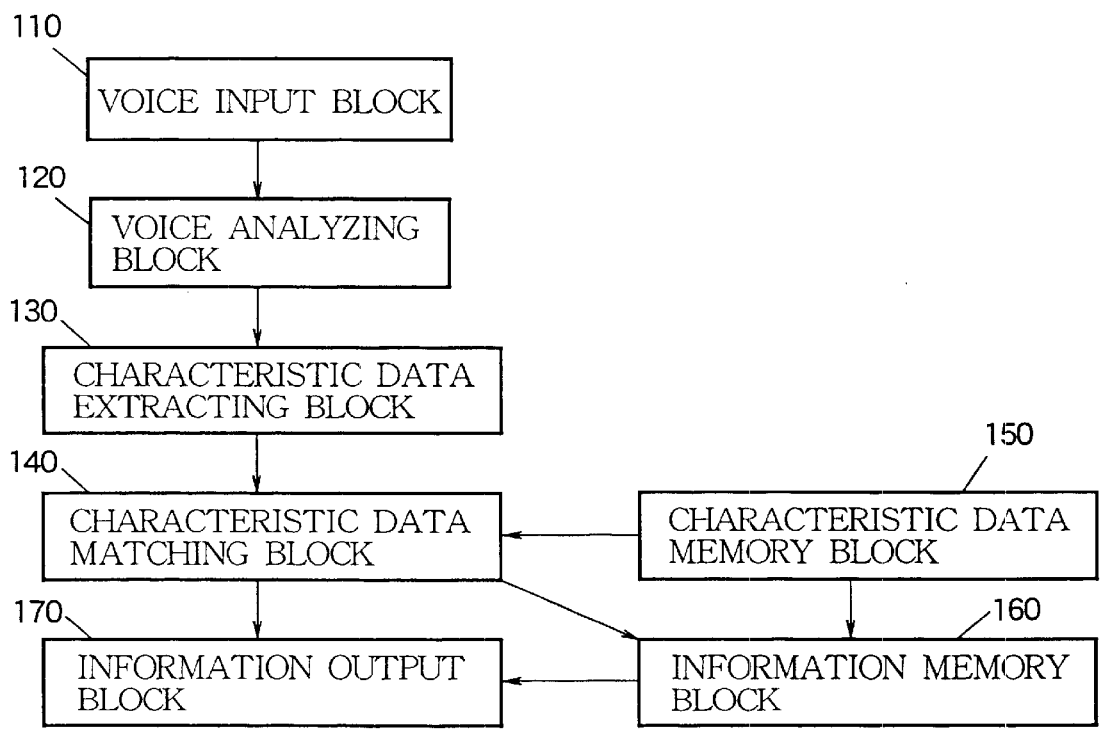
FIG. 3 is a block diagram illustrating the configuration of a conventional voice recognition apparatus.

The following describes a second preferred embodiment of the invention with reference to FIG. 2. The second preferred embodiment differs from the first preferred embodiment in that the second preferred embodiment has a plurality of microphones 11 for picking up a sound to generate respective input signals of the same sound, and has a source location detecting block 60 for detecting the location of a sound source.

As shown in FIG. 2, each microphone 11 converts an input sound into an analog electrical signal. The source location detecting device 60 is composed of a power comparing block 61, a source location identifying block 62, and an announcement cancel block 63. The power comparing block 61 compares a sound power picked up by each microphone 11 on the basis of the sound frequency spectrum obtained by a frequency analyzer 30 with other sound power picked up by other microphone 11. Based on the comparison results, the power comparing block 61 identifies the microphone 11 nearest to the source location of the input sound with reference to each microphone identification number or code.

The source location identifying block 62 identifies the approximate location of the sound source on the basis of the results of the sound power analysis for each microphone 11 and the identification of the nearest microphone 11, and generates sound source location information, which is sent through the information transmitter/receiver 70 to the remote terminal. Namely, the inventive information apparatus is constructed for notifying output information to the remote terminal in response to the input signal of the sound. In the apparatus, the first memory block 51 stores characteristic data representing characteristics of various sounds. The second memory block 52 stores various items of output information corresponding to the characteristic data of the various sounds such that each item of the output information is associated with each sound. A plurality of input devices are spatially distributed in the form of the microphones 11 to collect a sound from a source location, and respectively provide input signals of the same sound. The detector device 60 processes the input signals provided from the spatially distributed input devices to detect the source location of the sound. At least one of the analyzer devices 30 extracts characteristic data from at least one of the input signals of the collected sound. The controller device 40 operates according to the extracted characteristic data for addressing the first memory block 51 and the second memory block 52 to identity the item of the output information corresponding to the collected sound. The transmitter device 70 transmits the identified item of the output information to the remote terminal together with the detected source location of the sound.

On the other hand, the remote terminal is provided for use in combination with the information apparatus described above. In the remote terminal, the receiver device 80 receives the output information transmitted from the information apparatus. A stimulator device composed of the receipt notifying block 81 is activated when the output information is received by the receiver device 80 for physically stimulating a user of the remote terminal to draw attention of the user to the output information. The display block 82 displays the received output information such that the stimulated user can readily read the output information.

The announcement cancel block 63 stores, beforehand, specific items of sounds which should not inherently be detected by the microphones 11. If an unwanted sound is received by the microphones 11, the announcement cancel block 63 cancels the sending of the sound source location information to the information transmitter/receiver 70. A sound which should not be detected is exemplified by an alarm siren of an ambulance generated from a television set in a room. If this happens, such an alarm siren is recognized as false sounds. Namely, the canceler device or the announcement cancel block 63 checks whether the output information associated with the sound is true or false according to the source location of the sound, and cancel s transmission of the output information if the output information is false.

2.2 Operation

The following describes the operation of the second preferred embodiment. The description of the components similar to those of the first preferred embodiment will be skipped generally. The second preferred embodiment differs from the first preferred embodiment in the provision of a source location detecting mode and an error operation cancel mode. In the source location detecting mode, the microphone 11 which is nearest to the sound source is identified and the identification number or code of that microphone is displayed along with the sound source location information. According to this mode, the sound generated from a specific source location is picked up by the plural microphones 11 to identify the specific source location, thereby telling the user of the sound source location.

In the error operation cancel mode, if the sound recognition result indicates that it is inherently impossible for one of the microphones 11 to pick up a certain sound, it is determined likely that the recognition result is erroneous. Upon such determination, the sending of the announcement information to the information transmitter/receiver 70 is canceled. In this mode, if the microphone 11 arranged in a room picks up an alarm sound coming from the television receiver, the canceling sequence of operations takes place.

With the conventional sound recognition equipment, if an alarm sound coming from a television receiver is detected, it is determined that a real alarm is sounding and the announcement information based on text or image telling the alarm sounding is sent to an information output block. Consequently, the user, who may be an auditory handicapped person, is informed erroneously, sometimes taking actions in vain.

To overcome this problem, with the information announcing apparatus practiced as the second preferred embodiment of the invention, if the controller 40 determines that a sound which should not be detected at microphone installation locations has been picked up, the information announcing apparatus determines it unnecessary to tell the user of the detected sound, upon which the controller 40 operates so that the announcement information associated to the detected sound is not sent to the information transmitter/receiver 70.

2.3 Effects of the Second Preferred Embodiment

According to the second preferred embodiment of the invention, the microphone 11 is provided in plurality for detecting a sound signal. Consequently, as compared with the sound detection with only one microphone, the second preferred embodiment can detect sounds that occur in a wide range. In addition, the comparison among the sound powers picked up by the plural microphones 11 spaced apart from each other allows the identification of the microphone nearest to the sound source. Displaying the identification number or code of that microphone along with the announcement information indicative of the meaning of the sound allows the user to realize what sound has occurred even if the user is located away from the sound source. Further, any sound that should not be inherently detected is not announced, thereby eliminating the problem of false alarming.

3. Other Embodiments

A machine-readable medium M (FIG. 1) may be used in the inventive information apparatus having a central processing unit in the controller 40, the first memory block 51 storing characteristic data representing characteristics of various sounds, and the second memory block 52 storing various items of output information corresponding to the characteristic data of the various sounds such that each item of the output information is associated with each sound. The medium M such as a floppy disk or CD ROM is loadable into a disk drive of the storage device 50, and contains program instructions executable by the central processing unit of CPU for causing the information apparatus to perform a process of notifying output information to a remote terminal in response to an input signal of a sound. The process is performed by the steps of collecting a sound to provide an input signal of the collected sound, extracting characteristic data from the input signal of the collected sound, addressing the first memory block and the second memory block based on the extracted characteristic data to identity the item of the output information corresponding to the collected sound, transmitting the identified item of the output information to the remote terminal, and registering a new sound and a corresponding item of output information to update the first memory block and the second memory block such that characteristic data is extracted from the new sound and the corresponding item of the output information is determined in association with the new sound, and then the extracted new characteristic data is stored in the first memory block while the corresponding item of the output information is stored in the second memory block.

Otherwise, the process is performed by the steps of operating a plurality of input devices arranged in different locations to collect a sound from a source location such that each input device provides each input signal of the same sound emitted from the source location, treating the input signals provided from the plurality of the input devices to detect the source location of the sound, extracting characteristic data from at least one of the input signals of the collected sound, addressing the first memory block and the second memory block based on the extracted characteristic data so as to identify the item of the output information corresponding to the collected sound, and transmitting the identified item of the output information to the remote terminal together with the detected source location of the sound.

As described and according to the invention, the user can register any desired sound signal into the memory device of the information apparatus, thereby providing information announcement under various usage conditions. In addition, the announcement information can be transferred between the information announcing apparatus and the information announcing terminal device, thereby securing information announcement even if a sound source location and an announcement information receiving location are in a spaced relation from each other. Further, the approximate location of a sound source can be detected to notify the sound source location along with the contents or meanings of the detected sound. At the same time, any sound that should not be inherently detected is prevented from being announced to thereby eliminate the problem of false alarming.

While the preferred embodiments of the present invention have been described using specific terms, such description is for illustrative purposes only, and it is to be understood that changes and variations may be made without departing from the spirit or scope of the appended claims.

What is claimed is:

1. An information apparatus for notifying output information to a remote terminal in response to an input signal of a sound, comprising:
   a first memory block to store characteristic data representing characteristics of various sounds;
   a second memory block to store various items of output information in correspondence to the characteristic data of the various sounds such that each one of the items of the output information is associated to each sound;
   an input device that collects the sound to provide the input signal of the collected sound;
   an analyzer device that extracts characteristic data from the input signal of the collected sound;
   a controller device that operates according to the extracted characteristic data for addressing the first memory block and the second memory block to identify one of the items of the output information corresponding to the collected sound; and
   a transmitter device that transmits the identified one of the items of the output information to the remote terminal,
   wherein a new sound and a corresponding item of the output information can be registered for updating the first memory block and the second memory block such that the analyzer device extracts new characteristic data from the new sound, and the controller device registers the extracted new characteristic data into the first memory block and registers the corresponding one of the items of the output information into the second memory block.

2. The information apparatus as claimed in claim 1, wherein the analyzer device analyzes a frequency spectrum of the sound to extract therefrom a characteristic pattern, which is stored as the characteristic data in the first memory block, and the controller device uses the characteristic pattern as an index to identify the one of the items of the output information corresponding to the sound.

3. A method of notifying output information to a remote terminal in response to an input signal of a sound, comprising the steps of:
   storing characteristic data representing characteristics of various sounds in a first memory;
   storing various items of output information in correspondence to the characteristic data of the various sounds in a second memory such that each one of the items of the output information is associated to each sound;
   collecting the sound to provide the input signal of the collected sound;
   extracting the characteristic data from the input signal of the collected sound;
   addressing the first memory and the second memory based on the extracted characteristic data to identify each one of the items of the output information corresponding to the collected sound;
   transmitting the identified one of the items of the output information to the remote terminal; and
   registering a new sound and a corresponding one of the items of output information to update the first memory and the second memory such that new characteristic data is extracted from the new sound and the corresponding one of the items of the output information is determined in association with the new sound, and then the extracted new characteristic data is stored in the first memory while the corresponding one of the items of the output information is stored in the second memory.

4. A machine-readable medium for use in an information apparatus having a central processing unit, a first memory memorizing characteristic data representing characteristics of various sounds, and a second memory memorizing various items of output information in correspondence to the characteristic data of the various sounds such that each item of the output information is associated to each sound, the medium containing program instructions executable by the central processing unit for causing the information apparatus to perform a process of notifying output information to a remote terminal in response to an input signal of a sound, wherein the process comprises the steps of:
   collecting a sound to provide an input signal of the collected sound;
   extracting characteristic data from the input signal of the collected sound;
   addressing the first memory and the second memory based on the extracted characteristic data to identity the item of the output information corresponding to the collected sound;

transmitting the identified item of the output information to the remote terminal; and registering a new sound and a corresponding item of output information to update the first memory and the second memory such that new characteristic data is extracted from the new sound and the corresponding item of the output information is determined in association to the new sound, and then the extracted new characteristic data is memorized in the first memory while the corresponding item of the output information is memorized in the second memory.

5. An information apparatus for dispatching an output signal of a sound, comprising:

first memory means to store characteristic data representing characteristics of various sounds;

second memory means to store various output phrases in correspondence to the characteristic data of the various sounds such that each output phrase is associated to each sound;

means for collecting the sound to provide an input signal of the collected sound;

means for extracting characteristic data from the input signal of the collected sound;

means for addressing the first memory means and the second memory means based on the extracted characteristic data to identify the output phrase corresponding to the collected sound;

means for transmitting the identified output phrase to a remote terminal; and means for registering a new sound and a corresponding output phrase such that new characteristic data is extracted from the new sound and the corresponding output phrase is determined in association with the new sound so that the extracted new characteristic data is stored in the first memory means and the corresponding output phrase is stored in the second memory means.

* * * * *